United States Patent [19]

Wartenberg

[11] Patent Number: 4,552,785
[45] Date of Patent: Nov. 12, 1985

[54] PROCESS FOR THE PRODUCTION OF PATTERNED LUSTRE COATINGS ON SURFACES OF BODIES

[76] Inventor: Erwin W. Wartenberg, Brunnenwiesen 6, 7000 Stuttgart 71, Fed. Rep. of Germany

[21] Appl. No.: 547,758

[22] Filed: Nov. 1, 1983

[30] Foreign Application Priority Data

Nov. 13, 1982 [DE] Fed. Rep. of Germany ....... 3242069

[51] Int. Cl.$^4$ .............................................. B05D 5/06
[52] U.S. Cl. .................................... 427/229; 427/226; 427/259; 427/431; 427/443.2; 427/269
[58] Field of Search ............... 427/259, 226, 229, 269, 427/287, 383.5, 368, 443.2, 431, 314; 65/60.5, 60.51, 60.4, 60.52

[56] References Cited

U.S. PATENT DOCUMENTS

| | | | |
|---|---|---|---|
| 3,773,543 | 11/1973 | Wartenberg | 427/263 |
| 3,932,681 | 1/1976 | Forker, Jr. et al. | 427/314 |
| 3,978,249 | 8/1976 | Cooke | 427/259 |
| 4,056,643 | 11/1977 | Kume | 427/226 |
| 4,206,254 | 6/1980 | Schmeckenbecner | 427/259 |
| 4,262,040 | 4/1981 | Russo | 427/229 |

FOREIGN PATENT DOCUMENTS 0907368 10/1962 United Kingdom ................ 427/259

Primary Examiner—Evan K. Lawrence
Attorney, Agent, or Firm—Leydig, Voit & Mayer Ltd.

[57] ABSTRACT

The invention relates to a process for the production of patterned lustre coatings on surfaces of bodies of glazed ceramic, in particular, tiles, glass or enamel using a cover corresponding to the pattern to be produced. On the surface of the body acting as substrate, a negative of the pattern is produced by a paste applied by screen printing, the body provided with the pattern negative is heated in a furnace to a temperature above approximately 400° C., the body is subsequently dipped into the solution of a metallic compound which reacts with the surface of the body not covered by screen printing to form a thin layer of the metal and oxides of the metal. In the metal/metal oxide layer of the body whose surface is cooled down by dipping, lustre colors are produced by heat input. Finally, after formation of the lustre colors, the screen printing paste constituting the pattern negative is removed from the body.

4 Claims, 4 Drawing Figures

Fig. 1

PROCESS FOR THE PRODUCTION OF PATTERNED LUSTRE COATINGS ON SURFACES OF BODIES

DESCRIPTION

The invention relates to a process for the production of patterned lustre coatings on surfaces of bodies of glazed ceramic, glass or enamel using a cover corresponding to the pattern to be produced, wherein the body is heated to a temperature above approximately 400° C., and the heated body is dipped into a solution of a metallic compound kept below the temperature of the body which chemically reacts with the surface of the heated body to form a thin layer comprised of the metal and oxides of the metal, and, finally, lustre colors are created by the introduction of heat in the metal/metal oxide layer of the body whose surface has been cooled down by the dipping. Bodies consisting of ceramic—plate-shaped tiles, plates, vanes and the like—can be used.

Such a process is known from German Pat. No. 2,108,849, according to which patterns in the form of different colorations are, for example, achievable by parts of the body being covered during the heating and therefore not reaching the temperature of above approximately 400° C.

It is, furthermore, known (German Auslegeschrift No. 2,306,474) to effect the heat input required for the development of the lustre colors from the metal/metal oxide layer by allowing the residual heat originating from the heat content of the heated body prior to the dipping to act on the metal/metal oxide layer.

The object underlying the invention is to provide a simple and effective process for the production of patterned lustre coatings on plate-shaped bodies, in particular, glazed tiles, which is reproducible in industrial application.

The object is attained in accordance with the invention by the following features:

(a) a negative of the pattern is produced on the surface of the body by application of a paste by screen printing;

(b) the body provided with this pattern negative is heated to the temperature above approximately 400° C.;

(c) the heated body provided with the pattern negative is dipped into the solution of the metallic compound which reacts with the surface of the body not covered by screen printing to form the thin metal/metal oxide layer;

(d) after formation of the lustre colors in the uncovered parts of the surface, the pattern negative is removed from the body.

It is particularly advantageous to remove the pattern negative by brushing-off, in particular, dry brushing-off.

A screen printing paste usable for performing the process according to the invention consists of a liquid base medium to which there are added a finely powdered, inorganic covering substance of foliated crystalline structure and a likewise finely powdered bonding agent which produces an adhesive connection between the surface of the body and the covering substance. Particularly suitable as covering substance is a silicate, preferably magnesium silicate (talc). A silicate with cross-linked structure, in particular, titanium silicate, or a silicate of noble earths, preferably zirconium silicate, has proven to be particularly advantageous as bonding agent. Water or a screen printing oil are advantageously used as base medium.

The following description serves in conjunction with the attached drawings to explain the invention in greater detail.

Figure 1:
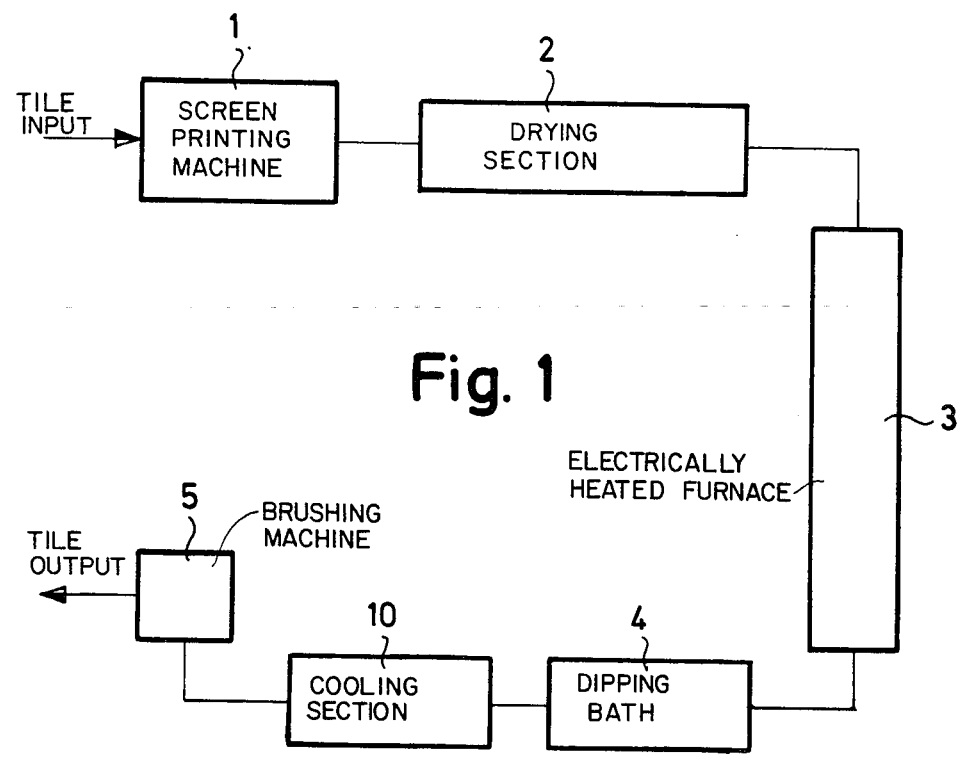
FIG. 1 is a schematic illustration of a system for the production of patterned lustre coatings on the surfaces of glazed tiles.

FIG. 1 is a schematic illustration of a screen printing machine 1, known per se, such as manufactured, for example, by the firm of Cibec, 41049 Sassuolo, Italy. Connected to the screen printing machine 1 is a drying section 2 for the screen printing paste applied in the screen printing machine 1. In a continuous heat-treating furnace 3, objects can be heated up to a temperature above approximately 400° C., for example, between 450° and 550° C. Reference numeral 4 designates a dipping bath containing a solution of at least one pyrolytically decomposable compound of a metal existing in several valencies. The solution is pre-heated to a temperature below its boiling point. Behind the dipping bath 4 is a brushing machine 5 comprising, for example, rotatingly driven brush rolls. A cooling section 10, provided, for example, with cooling blowers, is located in front of the brushing machine 5.

Figures 2, 3, 4:
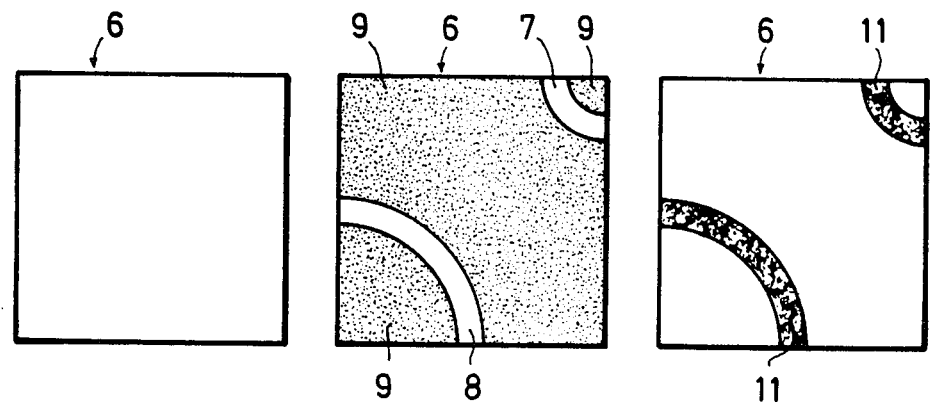
FIG. 2 shows an untreated tile.
FIG. 3 depicts the tile of FIG. 2 covered by screen printing paste with the negative of the pattern to be produced.
FIG. 4 illustrates the tile of FIGS. 2 and 3 provided with a patterned lustre coating, after termination of the treatment.

The system shown in FIG. 1 is designed to apply a patterned lustre coating to rectangular, preferably square tiles, as illustrated in FIG. 2. The pattern of the lustre coating should have, for example, the form shown in FIGS. 3 and 4 comprising two circular arc shaped stripes. Plates or other hollow bodies, e.g., vases can also be decorated according to the same principle by altering the screen printing system.

The clean, e.g., single-colored tiles 6 are fed by a conveyor device at the tile input into the screen printing machine 1 where a mask in the form of screen printing paste is applied in a conventional manner to its glazed top side. The mask has the form of the negative of the pattern to be produced, i.e., the portions 7, 8 to be provided with a lustre coating are not covered by the screen printing paste 9. In these portions 7, 8 the glazed surface of the tile 6 lies freely open. The screen printing paste 9 dries when the tile 6 partially covered with it passes through the drying section 2 after having left the screen printing machine 1. In the electrically heated furnace 3, the tile 6 partially covered with the negative of the pattern is heated to a temperature above approximately 400° C., for example, 550° C., and subsequently delivered to the dipping bath 4. Conveyor devices, for example, chain conveyors ensure automatic transportation of the tiles through the sequential stations of the system. In the dipping bath 4, there forms around the dipped-in, heated tile due to the evaporating liquid and the Leidenfrost phenomenon, a gas envelope which contains bath solvent molecules and the molecules of the dissolved metallic compounds. The molecules of the metallic compounds decompose pyrolytically on the surface of the tile lying freely open and uncovered by the screen printing paste and form there a uniform, thin layer of a mixture of metal and metal oxide phases. The layer thickness lies in the order of magnitude of the wavelength of light. It can be regulated by setting of the concentration of the metallic compounds in the dipping bath and/or by setting of the temperature of the body to be coated. The regulation of the layer thickness is essential, since by it the color effect to be achieved is co-determined.

After a short time, for example, 1 to 20 seconds, the tiles 6 are taken out of the dipping bath 4 again and brought into the ambient atmosphere. The surface of the tile 6 has cooled down where the metal/metal oxide layer has deposited. After leaving the dipping bath 4, the residual heat still remaining in the tile rapidly heats up the tile and the metal/metal oxide layer applied thereto. During this heating, the desired lustre color, designated 11 in FIG. 4, forms in the unmasked areas 7, 8 of the tile 6 as a result of redox processes and phase transitions.

Following formation of the lustre color and cooling in section 10, the screen printing paste used for masking purposes is brushed off in the brushing machine 5—preferably dry, i.e., without the addition of a cleaning liquid—so as to produce, at the tile output, the tile shown in FIG. 4 provided with a patterned lustre coating. The original tile shown in FIG. 2 may, for example, be white, while the lustre color 11 may have a gold or silver shining appearance. The paste may also be washed off with liquid.

The crux of the invention consists in that in the screen printing process not the pattern form as such, but rather its negative is applied to the surface of the body to be patterned, and the surface portions masked by the paste are thereby prevented from being coated in the dipping bath 4, so that the desired pattern forms exactly in the uncovered surface areas of the body.

An essential feature of the invention is, furthermore, that the screen printing paste withstands the heat treatment in the furnace above 400° C. and the liquid treatment in the dipping bath without peeling off, and yet when the tile cools down it can be brushed off dry from the tile surface. This is achieved by the composition of the screen printing paste.

The screen printing paste may consist of a liquid base medium to which there are added a finely powdered, inorganic covering substance of foliated crystalline structure and a likewise finely powdered bonding agent in such a concentration that the paste acquires the consistency necessary for performing the screen printing. Silicates, in particular, magnesium silicate (talc), proved particularly suitable as covering substance. The bonding agent may be a silicate with cross-linked structure, in particular, titanium silicate or a silicate of noble earths, preferably zirconium silicate. Water, alcohol or a common screen printing oil with the addition of surface-active agents proved suitable as base medium.

The brushes of machine 5 are preferably provided with plastic bristles.

As solvents for the dipping bath 4, organic liquids, preferably halogenated hydrocarbons, alcohols or chlorobenzene are suited. Particularly appropriate as pyrolytically decomposable metallic compounds for the dipping bath 4 are: one or several carbonyls, for example, iron, copper, chrome, molybdenum, cobalt, nickel carbonyls or other organic metallic compounds such as acetyl acetonates and esters. The concentration of the metallic compound in the solution may lie between 0.01 and 5%. In the furnace 3, which may, for example, be a muffle furnace, the body to be provided with a lustre coating is heated to such a temperature that its surface does not yet melt. According to the process of the invention, colored lustre coatings can be produced on bodies of glazed porcelain, glazed ceramic, glass or enamel.

EXAMPLE I

An approximately 5 mm thick, white tile, glazed on one side, with a surface of 11×11 cm, is masked in the screen printing machine 1 with screen printing paste 9, as shown in FIG. 3, with the surface areas 7, 8 of the white tile surface remaining free. The tile thus coated with the negative of the pattern to be produced is heated in the furnace 3 to approximately 550° C. and subsequently lowered into a 0.5% solution of iron pentacarbonyl in butanol in the dipping bath 4 for 3 seconds. On the surface areas 7, 8 there forms a dark grey to black coating which, immediately the tile is removed from the dipping bath, on account of the residual heat content of the tile which heats up the surface areas 7, 8 again, changes its color to gold-yellow within a few seconds.

EXAMPLE II

The procedure according to Example I is repeated, but a 3% iron pentacarbonyl solution in butanol is used in the dipping bath 4. A deep red lustre coating forms.

The heat input required for the formation of the lustre colors does not necessarily have to originate from the residual heat of the body removed from the dipping bath 4. Between the dipping bath 4 and the cooling section 10 it is also possible to provide a further heat source, for example, a continuous heat-treating furnace, in which the body is brought to the temperature required for creating different lustre colors.

The invention claimed is:

1. Process for the production of patterned lustre coatings on surfaces of bodies of glazed ceramic, glass or enamel using a mask corresponding to the pattern to be produced, wherein the body is heated to a temperature above approximately 400° C., and the heated body is dipped into a liquid solution of a metallic compound kept below the temperature of the body, which metallic compound decomposes on the surface of the heated body to form a thin layer comprised of the metal and oxides of the metal, and, finally, lustre colors are created by the introduction of heat in the metal/metal oxide layer of the body whose surface has been cooled down by the dipping, characterized by the following features:

(a) producing as said mask a negative of the pattern on the surface of the body by screen printing said body with a paste which resists peeling when exposed to 400° C. and when dipped into said liquid solution of a metallic compound, said paste consisting of a liquid base medium, a finely powdered, inorganic covering substance of foliated crystalline structure and a likewise finely powdered bonding agent which produces an adhesive connection between the surface of the body and the covering substance;

(b) heating the body with the pattern negative to a temperature above approximately 400° C.;

(c) dipping the heated body provided with the pattern negative into said solution of a metallic compound, said metallic compound reacting with the surface of the body not masked by screen printing to form the thin metal/metal oxide layer, the thickness of said layer being regulated so as to allow achievement of the desired lustre color effect, the surface of said heated body being cooled by said dipping;
(d) heating the thin metal/metal oxide layer to form the desired lustre colors; and
(e) removing the pattern negative from the body by dry brushing-off without the addition of a cleaning liquid.

2. The process of claim 1, wherein the covering substance is magnesium silicate.

3. The process of claim 2, wherein the bonding agent is a silicate with cross-linked structure selected from the group consisting of titanium silicate and zirconium silicate.

4. The process of claim 1, wherein the base medium is at least one material selected from the group consisting of water, an alcohol, and a screen printing oil.

* * * * *